May 6, 1958     W. R. KISTLER     2,832,969
OARLOCK
Filed Sept. 8, 1953
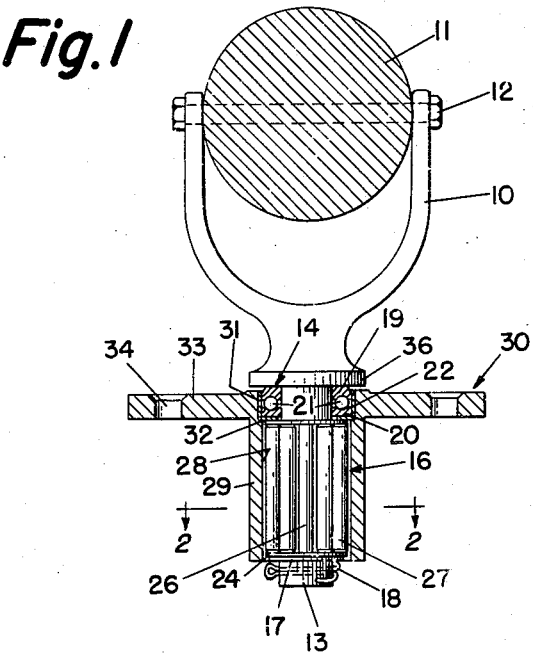
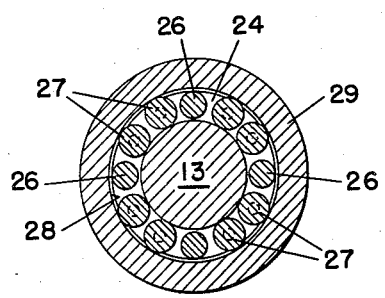
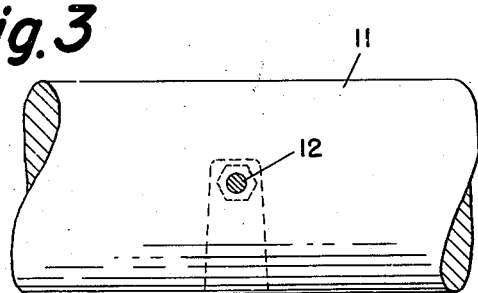
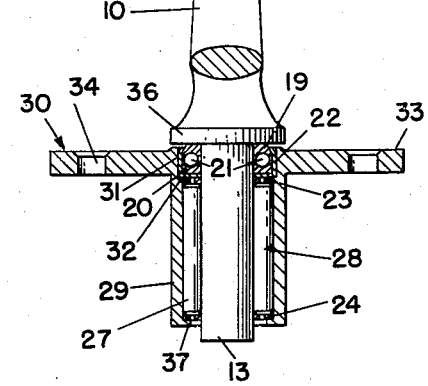
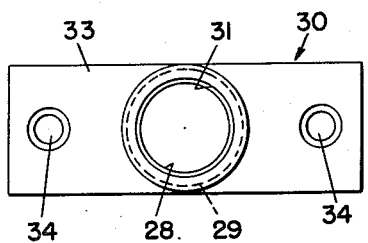
INVENTOR.
WARREN R. KISTLER
BY John D. Myers
ATTORNEY

United States Patent Office 2,832,969
Patented May 6, 1958

2,832,969

OARLOCK

Warren R. Kistler, Weatherly, Pa.

Application September 8, 1953, Serial No. 378,719

1 Claim. (Cl. 9—26)

This invention relates to improvements in oarlocks for rowboats.

Oarlocks in common use today are generally of the type having an oar supporting yoke or fork, with a tholepin extending from the lower end of the yoke and reposing in a socket or equivalent structure in the gunwale of the boat. With the rough treatment which oarlocks customarily receive, the contact surfaces of the tholepin and socket quickly become worn, resulting in loose, noisy and laborious operation of the lock.

It is an object of the invention to provide an oarlock of simple, durable construction, which is efficient in operation, and which may be quickly and easily installed in a boat.

A further object of the invention is to provide an oarlock wherein antifriction bearings are interposed between the moving parts to take up longitudinal as well as lateral thrust of the tholepin, thereby insuring quiet and effortless operation of the oarlock.

An additional object of the invention is to provide an oarlock as described in the above objects which may be fabricated inexpensively from standard parts.

Other objects and advantages of my invention will become apparent from the following description thereof taken in connection with the accompanying drawing, in which:

Fig. 1 is a vertical sectional view of a preferred form of oarlock according to the invention;

Fig. 2 is a cross-sectional view, on an enlarged scale, taken along line 2—2 of Fig. 1, looking in the direction of the arrows;

Fig. 3 is a vertical sectional view of a modified form of oarlock, with the yoke thereof rotated 90° from its position in Fig. 1; and Fig. 4 is a top plan view of one form of socket member of the oarlock adapted to be secured to the gunwale of a boat.

Referring now to the drawing, and particularly to Fig. 1, the embodiment of my invention there illustrated comprises a yoke or fork 10 for pivotally supporting an oar 11 by means of a bolt 12 extending across the open end of the yoke, as shown. Extending from the lower end of the yoke 10 is a tholepin 13 upon which is slidably mounted a thrust bearing 14 and a roller-bearing assembly 16, the bearings being retained on the tholepin 13 by means of a washer 17 and cotter pin 18 in conventional manner.

The thrust bearing 14 is of conventional construction and is in the form of a ball cage comprising annular upper and lower bearing races 19 and 20, respectively, with a plurality of ball bearings 21 disposed therebetween. The balls and races of the thrust bearing are loosely retained in their operative position by an annular shell 22. The roller-bearing assembly is also of conventional construction, taking the form of a roller cage comprising upper and lower annular end plates 23 and 24, respectively, rigidly joined in spaced relation by a plurality of rods or pins 26. Spaced between the pins 26 are a plurality of rollers 27, the centers of which lie in a circle within the annular end plates 23 and 24, the diameters of the rollers 27 being such that they will loosely contact the tholepin tangentially.

The tholepin 13, and the bearings 14 and 16 carried thereby, are removably fitted within a cylindrical bearing opening 28 of a boss 29 of a socket member 30. Preferably, the thrust bearing 14 is of larger diameter than the roller-bearing assembly 16, and the bearing opening 28 is correspondingly enlarged at its upper end as at 31, the enlargement 31 providing an annular shoulder 32 for firmly supporting the thrust bearing. The boss 29 projects from a plate or flange 33 having openings 34 to accommodate screws for attaching the socket member to the gunwale of a boat.

Means are provided on the tholepin for limiting entry thereof into the thrust bearing, whereby vertical thrust of the tholepin is transmitted to the thrust bearing, and in the drawing the means illustrated is in the form of a thrust collar 36 formed on the tholepin adjacent the yoke 10. The thrust collar 36 is adapted to rest on the upper race 19, whereby the thrust of the collar is transmitted to to the ball-bearing members 21. Equivalent means, such as a taper on the tholepin, may of course be substituted for the collar 36 for transmitting thrust to the bearing 14, if desired.

In the embodiment of the invention shown in Fig. 1, just described, the bearings 14 and 16 are of course removed with the yoke 10 when the oar is unshipped, inasmuch as the bearings are retained on the tholepin by means of the cotter pin 18. However, it is sometimes desirable to retain the bearings within the bearing opening 28 when the oars are removed from the boat, and this is permitted by the embodiment shown in Fig. 3.

In Fig. 3, the socket member is provided with an inturned flange 37 adjacent the lower end of the bearing opening 28, the flange forming a stop which is effective to substantially prevent relative axial movement of the roller-bearing assembly 16 with respect to tholepin 13 when the latter is in operative position in the bearing opening. In this modification, the thrust bearing 14 is press-fitted within the upper end of the bearing opening so that when the tholepin 13, which is positioned loosely in the bearings 14 and 16, is withdrawn from the bearing opening, these bearings are retained therein. Preferably, the bearing opening 28 is enlarged at its upper end, as described in connection with Fig. 1, to provide a shoulder 32 for accurately positioning the thrust bearing 14. However, the press-fitted thrust bearing will usually provide adequate support for the yoke 10 and its oar without requiring the additional support of the shoulder 32, particularly when the thrust bearing rests on the upper end of the roller-bearing assembly 16; therefore in the embodiment shown in Fig. 3, the enlargement 31 of the bearing opening may be omitted, if desired.

In operation, in both modifications described above, the weight of the oar and yoke are borne by the antifriction thrust bearing 14, while the rollers 27 serve as bearings between the tholepin and the bearing opening. As a consequence, the oar turns about its tholepin smoothly, lightly and noiselessly with the expenditure of a minimum of effort by the rower.

It will be understood that my invention is not to be limited to the precise details shown and described herein for the purpose of illustration, since various modifications thereof will be apparent to those skilled in the art without departing from the spirit of the invention as set forth in the appended claim.

What I desire to claim is:

In an oar mounting including a socket member for attachment to the gunwale of a boat and having therein a cylindrical bearing opening, a yoke for supporting an oar, and a tholepin projecting from the lower end of said yoke and extending axially into said bearing opening, the improvement comprising an annular ballbearing assembly supported within the socket member at the upper end of said opening and surrounding said tholepin, an enlargement on said tholepin for limiting entry thereof into said ball-bearing assembly, whereby downward thrust of said tholepin is transmitted to said socket member, an annular roller-bearing assembly loosely surrounding said tholepin within said bearing opening and extending substantially throughout the remainder of the length of said tholepin within said socket member, whereby lateral thrust of said tholepin is transmitted to said socket member, the lower end of the tholepin protruding below the bottom of the socket member, and retaining means affixed to the protruding lower end of said tholepin and in engagement with said roller-bearing assembly, said retaining means extending radially from said tholepin a distance less than the minimum diameter of said bearing opening, for substantially preventing independent longitudinal movement of said bearings relative to said tholepin while permitting the tholepin to be removed at will from the bearing opening in said socket member with the bearing assemblies retained upon the tholepin.

References Cited in the file of this patent

UNITED STATES PATENTS

| | | |
|---|---|---|
| 106,969 | Straight | Aug. 30, 1870 |
| 692,845 | Garrett, Jr. | Feb. 11, 1902 |
| 1,594,063 | Long | July 27, 1926 |
| 2,063,787 | Brown | Dec. 8, 1936 |
| 2,404,084 | Norton | July 16, 1946 |

FOREIGN PATENTS

| | | |
|---|---|---|
| 7,786 | Great Britain | 1888 |
| 28,621 | Great Britain | 1896 |
| 296,914 | Great Britain | Sept. 13, 1928 |
| 459,183 | France | Oct. 29, 1913 |